United States Patent [19]

Reichman et al.

[11] 4,439,301

[45] Mar. 27, 1984

[54] PHOTOELECTROCHEMICAL CELLS INCLUDING CHALCOGENOPHOSPHATE PHOTOELECTRODES

[75] Inventors: Benjamin Reichman, Birmingham, Mich.; Charles E. Byvik, Hampton, Va.

[73] Assignee: The United States of America as represented by the Administrator of the National Aeronautics and Space Administration, Washington, D.C.

[21] Appl. No.: 433,196

[22] Filed: Oct. 7, 1982

[51] Int. Cl.$^3$ .......................... C25B 1/02; H01M 6/36
[52] U.S. Cl. .............................. 204/278; 204/DIG. 3; 204/DIG. 4; 204/129; 204/280; 429/111; 423/303
[58] Field of Search ......... 429/111; 204/242, DIG. 3, 204/DIG. 4, 278, 280, 129; 136/252; 357/30; 423/303

[56] References Cited

PUBLICATIONS

C. E. Byvik et al., "Photoelectrochemical Response of Some Layered Chalcogenophosphate Compounds (MPX$_3$)," *J. Electrochem. Soc.*, vol. 129, pp. 237-238, (Jan. 1982).

C. E. Byvik et al., "Layered Transition Metal Thiophosphates as Photoelectrodes in Photoelectrochemical Cells," *Solar Energy Mat'ls.*, vol. 7, pp. 213-213, (Sep.-/Oct. 1982).

*Primary Examiner*—Aaron Weisstuch
*Attorney, Agent, or Firm*—Howard J. Osborn; John R. Manning; William H. King

[57] ABSTRACT

Photoelectrochemical cells employing chalcogenophosphate (MPX$_3$) photoelectrodes are disclosed, where M is selected from the group of transition metal series of elements beginning with scandium (atomic number 21) through germanium (atomic number 32) yttrium (atomic number 39) through antimony (atomic number 51) and lanthanum (atomic number 57) through polonium (atomic number 84); P is phosphorus; and X is selected from the chalogenide series consisting of sulfur, selenium, and tellurium. These compounds have bandgaps in the desirable range of 2.0 eV to 2.2 eV for the photoelectrolysis of water and are stable when used as photoelectrodes for the same.

6 Claims, 4 Drawing Figures

4,439,301

PHOTOELECTROCHEMICAL CELLS INCLUDING CHALCOGENOPHOSPHATE PHOTOELECTRODES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Due to the sharp increase in the price of oil, attention has been focused in recent years on developing alternative energy sources, such as solar energy. The sun provides the earth with ample energy, but problems have been encountered in converting the sun's photo energy into other useful forms of energy, such as electrical energy or storable chemical energy.

One device which has been utilized to convert solar energy into electrical energy is the photovoltaic cell which employs semiconductors absorbing electromagnetic radiation in the visible and near IR region of the sun's spectrum. For a semiconductor to absorb light, the light must be at least of some minimum energy, referred to as the bandgap of the semiconductor and being characteristic of the particular semiconductor and its crystalline structure. Thus, all light of an energy greater than or equal to the bandgap is available for absorption and energy conversion, whereas all light of an energy less than the bandgap is not. The bandgap also defines the maximum potential output voltage of the semiconductor when used in an energy conversion device. It is therefore preferable that the bandgap of the semiconductor be relatively small so that a high percentage of the solar spectrum will be available for absorption, but not so small that the output voltage of the cell will be too low to be useful. The peak of the solar spectrum occurs about 2.5 eV with the curve dropping sharply as energy increases and tapering off slowly as energy decreases. Based on this, the most potentially efficient semicondutors for photovoltaic cells have bandgaps of approximately 1.5 eV.

One of the major problems of solar energy as a power source and photovoltaic cells as a conversion device is the inconsistency of sunlight, which is not available for power generation at night or on cloudy days. Photovoltaic cells only produce electricity and only when the sun is shining. Electricity may be converted to chemical energy and stored in batteries, but the batteries are bulky and expensive. Therefore, it is desirable to have an energy conversion device that is capable of converting solar energy to a storable form of energy so that energy will still be available during no or low sunlight periods. The photoelectrolysis cell is such an energy conversion device. Sunlight is used as the power source to drive an endothermic chemical reaction involving two redox couples, such as the photoelectrolysis of water to produce hydrogen and oxygen. The photoelectrolysis products may either be stored, or fed directly into fuel cells or other similar devices where the chemical energy is converted to electrical or mechanical energy. When a semiconductor is to be used as a photoelectrode in a photoelectrolysis cell, the electrolysis potential of the electrolyte and the overpotentials of the electrodes must also be taken into account when determining the optimum bandgap for the semiconductor. Considering these factors, the optimum bandgap for a semiconductor in a photoelectrolysis cell is between 1.75eV and 2.5 eV. For a more detailed discussion of the theoretical principals of photoelectrolysis cells see Deb and Wallace, and Noufi and Warren, *Proceedings of the Society of Photo-Optical Instrumentation Engineers*, Vol. 248, pp 38–57, and 80–87 (1981).

Previous materials for use as photoelectrolysis electrodes have primarily consisted of metal oxides or compound semiconductors. The compound semiconductors have desirable bandgaps, but tend to degrade when used as photoelectrodes in photoelectrolysis cells. The metal oxides, conversely, are generally stable but have bandgaps on the order of 3.0 eV or greater and thus are less efficient because a large portion of the solar spectrum is unavailable for absorption.

Thus, there is need in the art for semiconductors with small bandgaps on the order of 1.75 eV to 2.5 eV which are stable when used as photoelectrodes in photoelectrolysis cells.

Accordingly, it is an object of the present invention to provide a photoelectrochemical cell employing a class of efficient photoelectrodes which do not degrade when used in photoelectrolysis cells.

it is another object of the present invention to provide a photoelectrochemical cell employing a class of photoelectrodes with bandgaps on the order of 1.75 eV to 2.5 eV.

A further object of the present invention is provide a class of efficient and stable photoelectrodes which are made from relatively inexpensive starting materials.

SUMMARY OF THE INVENTION

According to the present invention, the foregoing and additional objects are attained by providing a photoelectrode employing a transition metal chalcogenophosphate ($MPX_3$) as the photosensitive material, where M is selected from the group of transition metal series of elements beginning with scandium (atomic number 21) through germanium (atomic number 32), yttrium (atomic number 39) through antimony (atomic number 51), and lanthanum (atomic number 57) through polonium (atomic number 84); P is phosphorus; and X is selected from the chalcogenide series consisting of sulfur, selenium, and tellurium. These compounds have desirable bandgaps on the order of 2.0 eV to 2.2 eV and are stable when used in photoelectrolysis cells having acidic electrolytes.

BRIEF DESCRIPTION OF THE DRAWINGS

A more complete appreciation of the invention and many of the attendant advantages thereof will be readily apparent as the same becomes better understood by reference to the accompanying drawings, wherein.

DETAILED DESCRIPTION OF THE INVENTION

Figure 1:
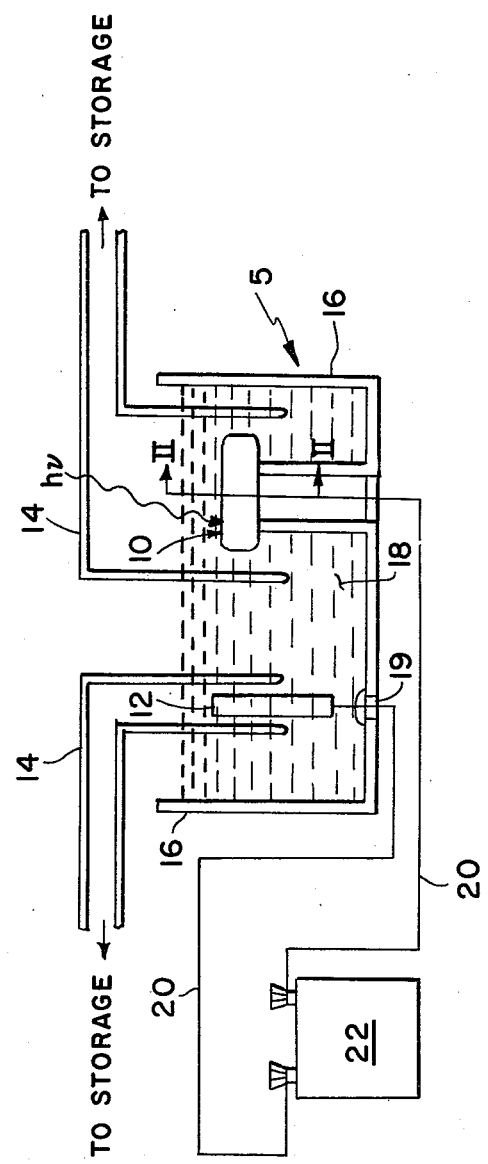
FIG. 1 is a schematic diagram of a photoelectrolysis cell employing the photoelectrode of the present invention.

In FIG. 1, the reference numeral 5 indicates generally a photoelectrolysis cell. Photoelectrolysis cell 5 is comprised of a photoelectrode 10, a counterelectrode 12, and an electrolyte solution 18 in a container 16. Gas collectors 14, made of a transparent material and positioned over the electrodes 10 and 12, are connected to separate storage systems, one system for the gas evolved at the anode and other system for the gas evolved at the cathode. The electrodes 10 and 12 are connected by wires 20 to the appropriate terminals of a variable DC power supply 22. Both the photoelectrode and the counterelectrode connections are sealed where they pass through container 16 with a sealant such as silicone as at 19. If water is to be electrolysed, the electrolyte solution 18 is comprised mainly of water with an acid added to make the solution acidic, so as not to degrade the surface of the photoelectrode.

Figure 2:
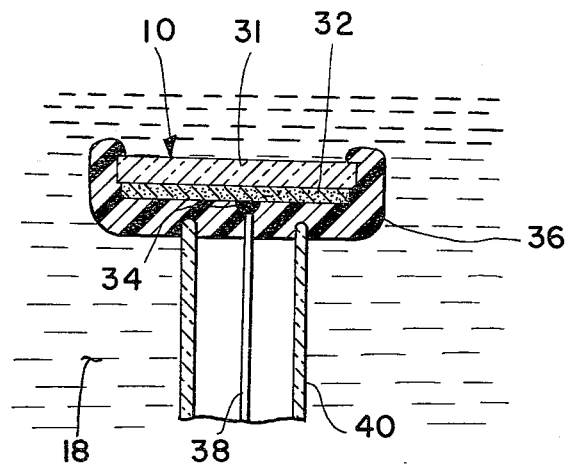
FIG. 2 is a cross-sectional view of the photoelectrode taken on line II—II of FIG. 1.

FIG. 2 depicts a cross-section of the photoelectrode of FIG. 1 represented generally by the reference number 10. Photoelectrode 10 is comprised of a crystal 31 of $MPX_3$ with an ohmic contact 32 on the back and a wire 38 connected thereto with a silver paste 34, wherein M is selected from the group of transition metal series of elements beginning with scandium (atomic number 21) through germanium (atomic number 32), yttrium (atomic number 39) through antimony (atomic number 51), and lanthanum (atomic number 57) through polonium (atomic number 84); P is phosphorous; and X is selected from the chalcogenide series consisting of sulfur, selenium, and tellurium. The photoelectrode is sealed wih a silicone adhesive 36 such that the back and the edges of the $MPX_3$ crystal are insulated from the electrolyte solution 18 and the tube 40 is sealed from leakage of the electrolyte solution. This sealing is important because the $MPX_3$ crystal will tend to degrade if the edges are exposed to the electrolyte.

In practice, a cell is arranged as in FIG. 1, with the photoelectrode 10 being made of an $MPX_3$ crystal as in FIG. 2 and the counter electrode 12 being either an inert electrode such as platinum or graphite or another photoelectrode. The variable DC power supply 22 is included to maximize the efficiency of the cell. The voltage or bias, required to be applied by the power supply will vary depending upon the electrode combination used—in some arrangements no bias will be necessary—and is determined by plotting a graph of net energy output (that is, the potential energy of the gas evolved minus the energy put into the system through the variable DC power supply) versus bias. The peak of that curve is the proper bias for maximum efficiency.

After the bias has been determined for the cell, the variable DC power source 22 is set for that voltage and the cell is arranged so that the photoelectrode 10 is exposed to sunlight (represented by hv in FIG. 1). Gas will then begin to be evolved at the electrodes, hydrogen at the cathode and oxygen at the anode for the electrolysis of water. Whether the photoelectrode is anodic or cathodic will depend upon whether it is an n-type or p-type semiconductor; n-type semiconductors being anodic and p-type being cathodic. If the counter electrode 12 is also a photoelectrode, making a so-called heterocell, the counter electrode must be of the opposite type from the other electrode (i.e., if the counter electrode is made of a p-type semiconductor, the other electrode must be made of an n-type semiconductor). This arrangement is usually more efficient because often no external bias is necessary due to the increased cell voltage from having two active electrodes.

Figure 3:
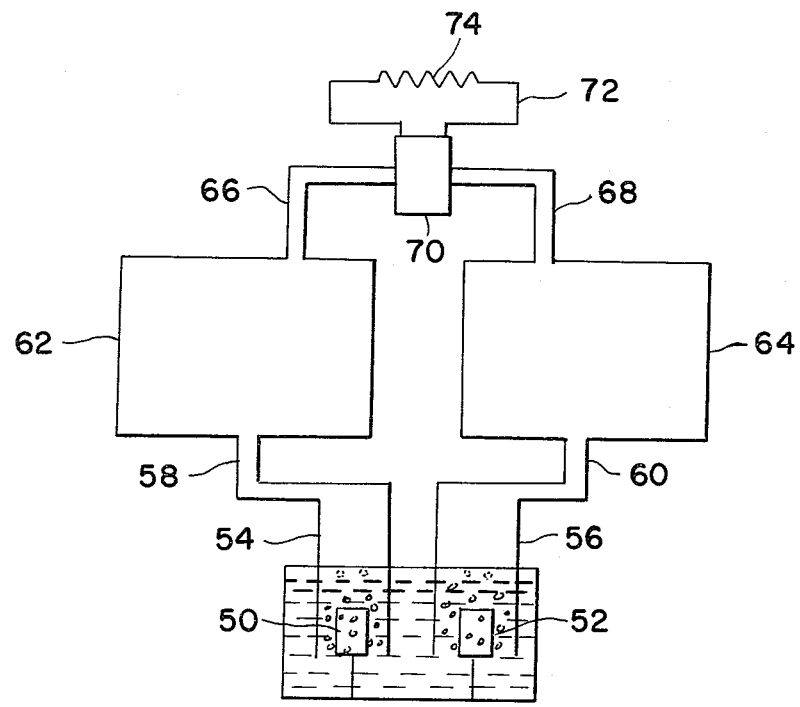
FIG. 3 is a schematic diagram of a photoelectrolysis cell connected to storage systems and an electricity generating system.

Referring now to FIG. 3, the oxygen evolved at anode 50 is trapped by gas collector 54 and fed through appropriate piping 58 into storage tank 62. In a like manner, the hydrogen evolved at cathode 52 is trapped by gas collector 56 and fed through piping 60 into a storage tank 64. As electrical power is needed, the oxygen and hydrogen are fed from the storage tanks 62 and 64 through piping 66 and 68 respectively into an energy conversion device 70, which may be, for instance, a fuel cell or a gas turbine in connection with a generator. The electricity thus generated may then be transmitted by power lines 72 to external loads 74 to be used as desired.

Table I is a tabulation of some of the physical characteristics of some representative $MPX_3$ electrodes. All figures are for layered, single crystal electrodes in a solution at a pH of 2. As can be seen, some $MPX_3$ crystals are n-type semiconductors and others are p-type. Thus, it is possible to construct a heterocell, as described above, using $MPX_3$ crystals for both electrodes, so that both electrodes will have the advantages of stability and small bandgaps.

TABLE I

| $MPX_3$ | $V_o$ (Volts vs. SCE*) | Conductivity Type |
|---|---|---|
| $SnPS_3$ | 0 | n |
| $FePS_3$ | 0 | p |
| $NiPS_3$ | +0.2 | p |

*Standard Calomel Electrode

Figure 4:
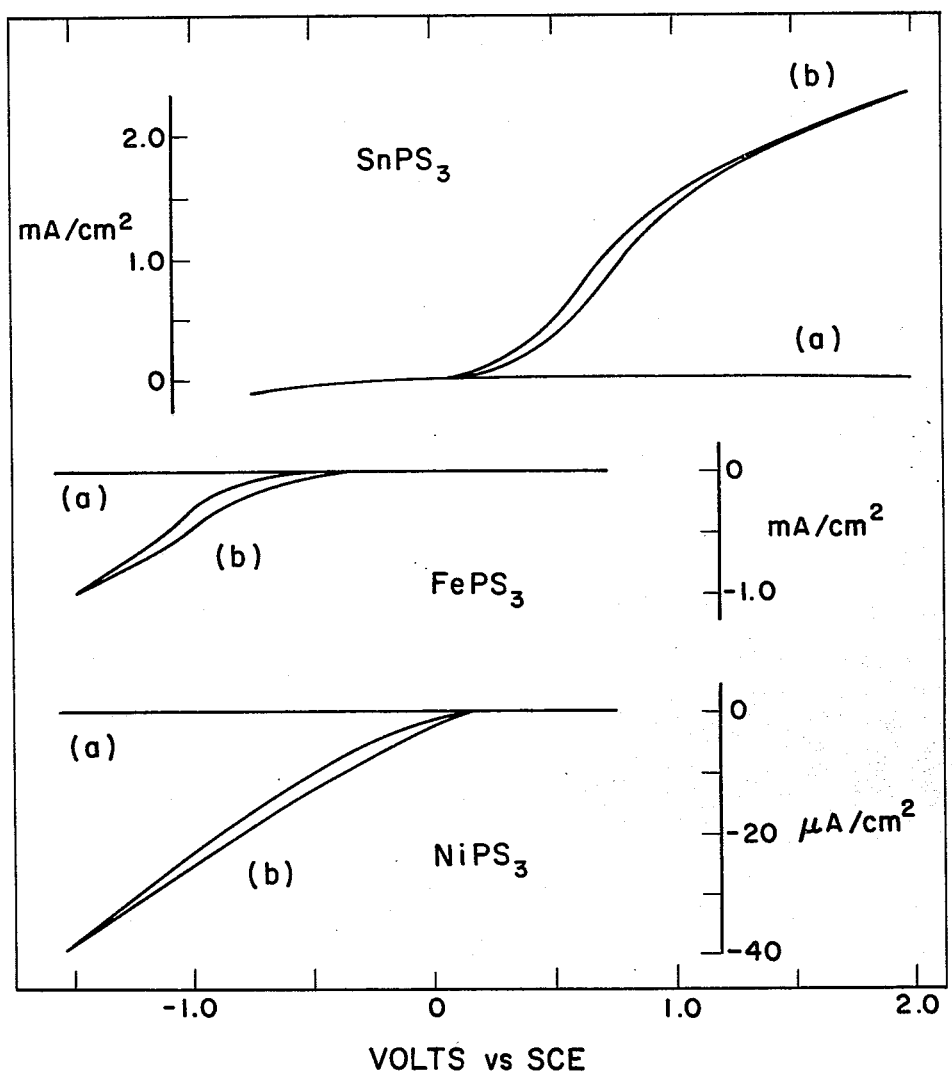
FIG. 4 depicts the curves for photocurrent versus applied voltage for three representative $MPX_3$ electrodes.

The photoelectrochemical response of three representative $MPX_3$ electrodes, $SnPS_3$, $NiPS_3$, and $FePS_3$, in a solution at pH=2 is shown in FIG. 4 which shows a plot of photocurrent versus applied potential. All three electrodes show low dark current clear photoresponse. That is, the curves clearly indicate the absorption of photo energy by the photoelectrodes. The Fe- and Ni-based crystals show photocathodic current typical of p-type semiconductors. The Sn-based crystal has a photoanodic response typical of n-type semiconductors. At the most extreme potentials shown in FIG. 4 (cathodic potential for p-type and anodic potential for n-type materials, for example, 2.0 volts for $SnPS_3$), gas was clearly seen to evolve from the electrode surface, presumably hydrogen for the iron-based p-type materials and oxygen for the tin-based n-type.

The photocurrent (about $2mA/cm^2$) at these extreme potentials remained constant to within about ten percent for times up to at least one hour for electrodes in acid solutions, indicating stability of the crystals. These materials were very unstable in basic solutions, however, as observed by a rapid decrease in the photocurrent and visible deterioration of electrode surface. The onset potential of the photocurrent for the p-type materials at pH=2 as measured by chopped light was 0 V and +0.2 V versus SCE for the Fe- and Ni-based crystals, respectively. These potentials are more positive than the reversible potential for the reduction of water, indicating the possibility of net gain in energy conversion. However, the change in the photocurrent with changing potential is slow, probably because of a high surface recombination of photogenerated carriers. The onset potential of the photocurrent for the n-type material $SnPS_3$ was found to be 0 V versus SCE in pH=2 solutions. This is about 850 mV more negative than the reversible potential for oxygen evolution at this pH, indicating a net gain in energy conversion. These electrodes also showed a slow rise in photocurrent with increasing anodic potentials. Spectral response experiments indicate that the bandgap of these materials is about 2 eV and is indirect. Indirect bandgap semiconductors are intrinsically less efficient than direct bandgap materials but also have less stringent manufacturing requirements and therefore are usually less costly. Improved photocurrents can be expected from improved growth conditions for the $MPX_3$ crystals.

Although the operation of the present invention has been described in connection with a specific embodiment thereof, it is not so limited and the specific structural features described herein are to be considered as illustrative only and not exhaustive. It is recognized, for example, that the application of the $MPX_3$ electrode is not limited to photoelectrolytic cells but may also have application in photovoltaic cells, where solar energy is converted directly into electrical energy, and other photoelectrochemical cells.

Obviously many modifications and variations of the present invention are possible in light of the above teachings. It is therefore to be understood that within the scope of the appended claims the invention may be practiced otherwise than as specifically claimed.

What is new and desired to be secured by Letters Patent of the United States is:

1. In a device for converting photo energy into another form of energy:
   a photoelectrode made from a layered transition metal chalcogenophosphate ($MPX_3$) selected from $SnPS_3$, $FePS_3$ and $NiPS_3$;
   a counter electrode;
   an acidic electrolyte solution surrounding said photoelectrode and said counter electrode; and
   an external electrical circuit connected to the two electrodes.

2. The device of claim 1 where one face of the layered $MPX_3$ photoelectrode is exposed to said electrolyte solution, and the other face is coated with an electrically conductive material, which is in electrical contact with an electrical circuit, and the photoelectrode is insulated such that only the aforementioned face of the $MPX_3$ and not its edges or any other part of the photoelectrode is in contact with the electrolyte solution.

3. A device for converting photo energy to another form of energy according to claim 1 wherein the external circuit includes a variable DC power source for adjusting the bias of the photoelectrode.

4. A device for converting photo energy to another form of energy according to claim 1 wherein the photoenergy is converted to storable chemical energy by means of photoelectrolysis of the electrolyte solution by the photoelectrode.

5. A device for converting photo energy to another form of energy according to claim 1 wherein the counter electrode is also made from a layered transition metal chalcogenophosphate ($MPX_3$) according to claim 1.

6. In a device for converting photo energy into another form of energy:
   a photoelectrode made from a layered transition metal chalcogenophosphate ($MPX_3$) selected from $SnPS_3$, $FePS_3$ and $NiPS_3$; and
   a contact attached to the photoelectrode for connecting the photoelectrode to an electrical circuit.

* * * * *